United States Patent [19]
Ugon

[11] Patent Number: 5,479,509
[45] Date of Patent: Dec. 26, 1995

[54] METHOD FOR SIGNATURE OF AN INFORMATION PROCESSING FILE, AND APPARATUS FOR IMPLEMENTING IT

[75] Inventor: Michel Ugon, Maurepas, France

[73] Assignee: Bull CP8, Louveciennes, France

[21] Appl. No.: 223,677

[22] Filed: Apr. 6, 1994

[30] Foreign Application Priority Data

Apr. 6, 1993 [FR] France .................................. 93 04073

[51] Int. Cl.⁶ ................................................ H04K 1/00
[52] U.S. Cl. .................................. 380/23; 380/4; 380/46
[58] Field of Search .................................. 380/23, 25, 4, 380/46

[56] References Cited

U.S. PATENT DOCUMENTS

| | | | |
|---|---|---|---|
| 4,965,827 | 10/1990 | McDonald | 380/25 |
| 5,048,085 | 9/1991 | Abraham et al. | 380/23 |
| 5,128,997 | 7/1992 | Pailles et al. | 380/23 |

FOREIGN PATENT DOCUMENTS

| | | |
|---|---|---|
| 0077238 | 9/1982 | European Pat. Off. . |
| 0281225 | 1/1988 | European Pat. Off. . |

OTHER PUBLICATIONS

IEEE Infocom '92 Proceedings, Florence, Italy, IEEE New York US, pp. 2045–2054, Y. Desmedt et al., "Multi–Receiver/Multi–Sender Network Security: Efficient Authenticated Multicast/Feedback".

NTT Review, vol. 5, No. 1, Jan. 1993, Tokyo, Japan, pp. 75–81, Okamoto et al., "On Comparison of Practical Digital Signature Schemes".

*Primary Examiner*—David C. Cain
*Attorney, Agent, or Firm*—Kerkam, Stowell, Kondracki & Clarke; Edward J. Kondracki

[57] ABSTRACT

The invention relates to a method for signature of a primary information processing file (FP), of the type consisting of causing circuits of an information processing device (1, 3, 4) to calculate at least one signature (SG) of the file, by using at least one secret datum (S; Sd) specific to the signer, but unknown to him, memorized in a secret memory zone of a portable electronic object (4), having a memory and processing circuits, which is at the disposal of the signer, and linking the calculated signature to the primary file. The invention is also characterized in that when each signature is calculated, it may further use at least one portion of the primary file, such that the signature is a function of the secret datum of the signer and of each portion handled of the file, and creating a secondary file (FS) and writing in it at least information (IN) enabling identification of each portion of the primary file that was used to calculate this signature, and linking the secondary file with the corresponding signature, on the one hand, and with the signed file, on the other.

17 Claims, 4 Drawing Sheets

METHOD FOR SIGNATURE OF AN INFORMATION PROCESSING FILE, AND APPARATUS FOR IMPLEMENTING IT

FIELD OF THE INVENTION

The invention relates to a method for signature of an information processing file, also called an electronic file, a method of signature verification, and an apparatus for implementing the method.

BACKGROUND OF THE INVENTION

Increasingly, information of any kind is exchanged among various conversation partners using information processing means; this is the case with electronic mail, for instance, which consists of transmitting files in the form of digital information.

Depending on the nature and/or importance of the information that the file contains, it may be necessary for its issuer, author etc., to be properly identified. It may also be necessary to verify that an authorized person has given his agreement or validated such a file, and do so in a way that is even more certain than with a manuscript or typewritten document. In fact, the author of a typewritten document or any person authorized to act upon such a document can be identified by each handwritten signature attached to it.

The concept of validating a document arises when documents that must be signed or initialized by one or more persons, for instance, to allow the execution of certain actions, are circulated. This is particularly true for official papers, printed administrative or bookkeeping forms, any document giving power of attorney to one or more persons, or any document (such as contracts) used for hiring more than one person.

With a paper document (handwritten or typed) it is relatively easy to learn the identity of its author or of persons who have validated it because each signature is affixed to the paper itself. This is not true for an electronic file. An electronic file is in fact made up of a section of bits having the logical value of "0" or "1". As a result, any indication, attached to such a file, of the identity of its author or of the persons who have validated it, is not sufficient to prove that the file, in the form in which it is at a given moment, is in the same state in which it was when those persons signed or validated it.

This is why the concept has arisen of electronically signing such files, by calculating for each signer, using processing circuits, an electronic signature that is a function of the contents of the file and of at least one parameter specific to a signer or group of signers, and associating each thus-calculated signature with the file. The verification of the identity of a signer consists of recalculating the signature, using the processing circuits, and comparing this recalculated signature with the associated signature.

A person seeking to commit fraud, that is, a person not authorized to sign, cannot modify a file and associate a coherent signature with it, because he does not have control of the parameter or parameters specific to the original signer or signers. Similarly, in a circulation of documents that are to be signed by more than one person, any modification of the file after at least one person has already signed it means that it is impossible to replace each already-calculated signature with a coherent signature.

One such method of calculating and verifying signatures is described in French Patent 2 514 593, corresponding to U.S. Pat. No. 4,656,474, and to European Patent No. 077238.

This method consists of providing each potential signer with a portable object, such as a microprocessor card (also called a chip card), whose memory contains a secret key accessible solely by the processing circuits of the object. The secret key is diversified; that is, it is different from one object or card to another, so that two different cards cannot sign the same message in the same way.

The signature step per se consists of coupling the object to an information processing apparatus (which may be the apparatus in which the file is processed, and/or from which it is transmitted to another apparatus), and signing the file by causing calculation algorithms to run in the apparatus and in the object, such that the signature is a function of the secret key and of the contents of the file.

To prevent the secret key from being divulged outside the object, either the signature is calculated entirely inside the object by its processing circuits or a partial result is calculated by the object and transmitted to the circuits of the processing apparatus, which complete the calculation. Or again, the processing apparatus begins the calculation, for example by using a data compression algorithm, and the object calculates the signature per se. After being calculated, the signature is then transmitted with the file and a datum relating to the identity of the signer.

Verification consists of recalculating the signature of a file, without divulging it, using the processing circuits of an appropriate apparatus, and then comparing this recalculated signature with the one that was attached to the file, and finally indicating only the result of the comparison (i.e., whether or not the signatures match). The recalculation is made possible because the processing circuits of the verification apparatus include an algorithm that enables them first to recalculate, without divulging, the diversified secret key of the signer from the datum relating to his identity, which had been transmitted with the file, and then from that recalculated key, recalculating the signature. The recalculated key is not divulged outside the circuits of the verification apparatus so that its secret nature will be preserved. The recalculated signature is not divulged, to prevent a person observing the verification operations and seeking to commit fraud from attempting to utilize the results of the recalculation for his own benefit.

Nevertheless, known signature methods have the disadvantage, in particular, of requiring the entire file to be handled during the calculation and verification of a signature, which can be a hindrance for various reasons.

A first reason, which is important when the file must be signed by a single person or by more than one person without any of them having made any changes, is that if the file can be very long, thus, the process of calculating and verifying the signature can take an unacceptable amount of time, which conflicts with the information processing goals.

A file contains both sensitive and non-sensitive information. The sensitive information, for example, is that relating to the background; this may involve numerical values when the file is a bookkeeping file, or particular paragraphs in a report or a letter. The nonsensitive information, for example is that relating to form; this involves accompanying texts, for instance, whose presence enriches the file without changing the background, and whose absence or modification is accordingly unimportant.

A second disadvantage applies when more than one person is supposed to sign the file while being authorized to modify certain zones of it or add information. In that case, with the known methods, only the signature of the last signer can be called authentic, since each modification or addition to the file means that the parameters that were used to develop the preceding signatures have been modified.

SUMMARY OF THE INVENTION

It is, therefore, an object of the invention is to make it possible to reduce the amount of time needed to calculate and verify the signature, compared with the methods of the prior art.

Another object of the invention is to enable the same file to be signed by more than one person even though it may possibly have been modified or undergone additions after a first signer had validated it.

These objects are attained by the present invention, which proposes a method for signature of a primary information processing file (FP), comprising the steps of:

calculating at least one signature (SG) of said primary information file (FP) using circuits of an information processing device (1, 3, 4) and using at least one secret datum (Sd; S), said secret datum being specific to a signer and being memorized in a secret memory zone of a portable electronic object (4), said portable electronic object having a memory and processing circuits and being at the disposal of the signer; linking the at least one signature to the primary information file, wherein each signature is calculated as a function of at least a portion of the primary information file and the secret datum of the signer; creating a secondary file (FS); writing information for enabling identification (IN), of each portion of the primary information file used to calculate the signature, in the secondary file; linking the secondary file with a corresponding signature; and linking the secondary file with a signed primary information file.

In another characteristic, in order to link the secondary file to the corresponding signature, this signature is written into the secondary file.

In another characteristic, the secret datum of each signer is memorized in a secret memory zone of a portable electronic object, having memory and processing circuits, that is at the disposal of the signer.

In another characteristic, preferably the datum specific to a signer is diversified so that two different signers cannot sign the same file in the same way. This characteristic makes it possible to identify each signer by, for example, retrieving his name by employing the method described in the aforementioned patents. Nevertheless, it is possible to use a nondiversified datum, that is, one common to at least more than one signer, when one wishes simply to verify that the file has been signed by some authorized person, without necessarily knowing exactly who it is.

One method for verifying a predetermined signature of a file calculated according to the present invention comprises identifying, using the secondary file, each portion of the file signed that was used to obtain the signature in question; recalculating the signature, using the processing circuits, by processing parameters corresponding to those used in the initial calculation; comparing the recalculated signature with the linked signature; and indicating the result of the comparison.

The invention is especially advantageous because, while preserving the security of the prior art methods, it has greater flexibility and multiple advantages.

In particular, as soon as a signer chooses to sign the entire file, because he thinks that its entire contents are made up of sensitive information, the information of the secondary file linked to the corresponding signature will indicate that this signature was calculated using the entire file. In that case, if a later signer changes the file, the preceding signature becomes incoherent; conversely, he can either sign it in his turn, in totality or in part, or add information and then calculate his own signature based on all or some of the information added and/or all or some of the information that the file contained before he made that addition.

Calculating each new signature then causes the creation of a new secondary file or of a new recording in the secondary file in which this new signature is written, with the information that enabled it to be set up.

Another advantage of the method is that it enables a person, who must validate a file after it has been signed by its author, to be able to indicate his agreement to the contents of only certain portions. To do so, this person who is to validate it can, in order to calculate his own signature, handle only those parts of the file with which he is in agreement.

BRIEF DESCRIPTION OF THE DRAWINGS

Further characteristics and advantages of the invention will become more apparent from the ensuing description, taken in conjunction with the accompanying drawings, in which:

DETAILED DESCRIPTION OF PREFERRED EMBODIMENT

Figure 1:
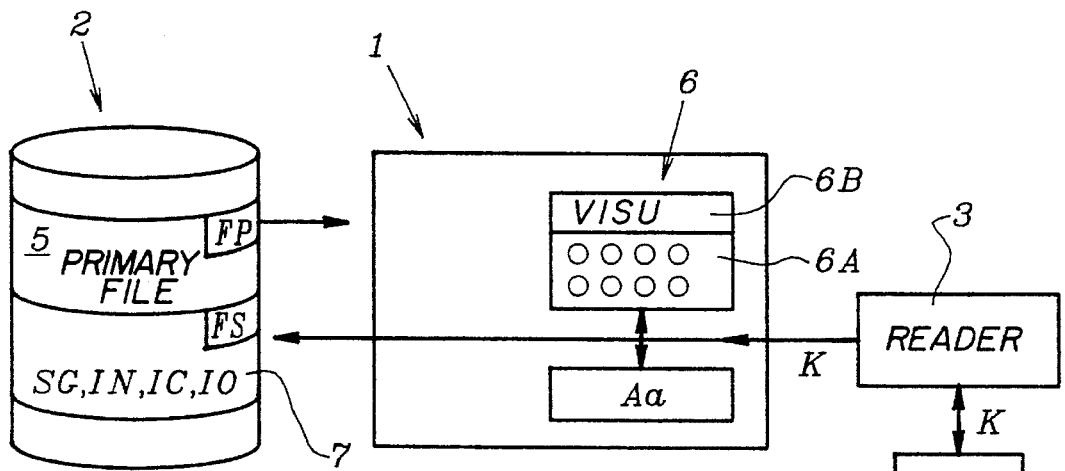

FIG. 1 illustrates the basic layout of a preferred system for implementing the invention;

FIGS. 2–7 show a preferred arrangement of each of the screens for dialog between the users and the system during the phases of signature and/or verification.

In FIG. 1, the basic layout of a preferred apparatus for implementing the invention is shown. The system shown may be used for both processing and/or verifying signatures.

The apparatus includes an information processing device 1, such as a computer, which is capable of processing information processing files. The device, in a known manner, includes means 2 for mass storage of data or files. These means may be magnetic diskettes, optical disks, or any conceivable storage device.

Furthermore, in the preferred embodiment, the device is associated with a reader 3 for a removable, portable electronic object 4, for example, a removable electronic medium, such as a microprocessor card, frequently referred to as a "smart" card. The electronic object 4 includes processing circuits and a secret memory zone in which data accessibly solely by the processing circuits are recorded. The secret memory zone contains at least one secret datum Sd, which is diversified in each card, i.e., that is different from one card to another. This makes it possible for the same calculation algorithm (encipherment, signature, etc.), to be run in all cards, and by processing the same input datum applied to all cards and the diversified datum in each card, gives different results from one card to another. The device 1 and the object 4 accordingly make up the signature or verification apparatus.

In another embodiment, the secret memory zone of the removable electronic medium 4 does not contain a diversified secret datum, but rather only a secret datum S, which is identical in all the cards intended for a particular application, or is identical among all the cards intended for a particular application that are issued to persons who have identical rights of access to that application. Diversification is only necessary when discrimination among all or some of the users is required.

Thus, for the same application, the secret datum may be nondiversified among the potential signers who have the same hierarchical rank, i.e., the same powers of signature or the same access rites. Conversely, diversification does exist between different hierarchical levels. This embodiment suffices when documents are circulated in which all that is needed is simple verification that a file has been signed by persons of different hierarchical rank, without precisely determining their identity. It is also possible that all the potential signers, regardless of their rank, may have an identical secret datum. In that case, one can simply verify that the file has been signed by some authorized person.

It is understood that from one information processing application to another, it is preferable that the data be diversified.

The device 1 includes processing circuits capable of running calculation algorithms, in particular an algorithm Aa for signature of at least some of a primary file FP contained in a portion 5 of its mass memory 2. When it is run, the algorithm Aa is recorded in a random access memory zone, for instance, of the device 1.

Furthermore, the device includes means 6 for interface and dialog with its users, in particular a keyboard 6A and a screen 6B. It may include other means, not shown, such as a mouse, a speech recognition device, etc.

The role of the removable electronic medium 4 is to furnish a key K, which is a function of the secret datum, either the diversified secret datum Sd or the nondiversified secret datum S that its memory contains, to the device 1 by way of the reader 3. The way in which this key K is developed will be explained hereinafter.

The key K is retrieved, when the signature algorithm Aa is run, by the processing circuits of the device, so that the signature SG will be a function of this key K and of at least some of the primary file FP.

As will be explained, the selection of the portion or portions of the primary file that are to be processed in order to calculate the signature can be done by the signer or automatically by the system.

According to the present invention, in order to enable verification of the signature SG, the calculation of each signature causes the creation of a new secondary file FS, or of a new recording in the secondary file that contains not only this signature SG but also parameters or information that make it possible to identify the data that were used to calculate it. This secondary file FS is developed by the device 1 and then written into a portion 7 of its mass memory 2.

In particular, among its constituent parameters, the secondary file FS includes information IN that makes it possible to retrieve the portions of the primary file FP that were used for calculating the signature. This may be information relating to the memory addresses of these portions, or any information enabling retrieval of these portions in the primary file.

Besides this information IN that enables retrieval of the portions of the primary file FP that were used to calculate the signature, the secondary file FS can also contain certain complementary information IC that can be used to help calculate the signature.

It is possible for the signature calculation algorithm Aa to differ from one device to another. It will be recalled that the same device must be capable of being used equally for calculating or for verifying signatures. At a given moment, for example because of software development, it may happen that the device that was used to calculate the signature used an older software version than the device used for verification would use if it had to sign something. It is also possible that, regardless of the software version, the two devices used completely different software for calculation. It may also be possible in the case of multiple signers, that the signatures of the same file have been calculated on different devices using different software. In other words, different apparatuses can be used to calculate the signatures.

For this reason, in this case, the complementary information IC that the secondary file FS contains includes data enabling identification of the apparatus, or in other words the device and/or algorithm, that was used in the calculation of the signature.

As noted above, the key K is calculated by the portable object 4, from the diversified secret datum Sd or nondiversified secret datum S that it contains. An object 4 containing a diversified secret datum Sd must be used when it is necessary to clearly identify the signer. Conversely, if it is merely necessary to verify that the signer is an authorized person, belonging to a limited group, then it is not necessary for the secret datum to be diversified. It suffices merely for it to be common to all the persons of that group. These principles are known in the prior art signature methods.

The calculation of the key K consists of running an algorithm Ao in the object, the algorithm being memorized in its processing circuits and handling, on the one hand, the diversified secret datum Sd or nondiversified secret datum S that its memory contains, and on the other, an external datum E which is developed in the device 1 and then transmitted from the device 1 to the object 4, in such a way that the key K is a function of both the secret datum Sd or S and the external datum E.

When the secret datum of the object 4 is diversified, it is necessary for the device that is to be used for the verification to be capable of retrieving it without divulging it, so that it can then recalculate the key K.

This can be done, for example, by implementing and adapting the method disclosed in one or another of the patents mentioned earlier in this present application, and whose teachings are incorporated by reference herein, or by implementing any known method that makes it possible to recalculate a diversified secret datum Sd of an object without divulging it and without having the object 4 that was used for the signature available.

The method disclosed in one or another of the patents and adapted to the present invention consists of associating, among the complementary information IC, for example, data IO identifying the object with the primary file FP and with the signature SG, by writing it in the secondary file FS, thus making it possible to recalculate or retrieve the diversified datum without divulging it, using the specific circuits of the verification device. These identification data may, for example, be constituted by p parameters representing addresses of small p elementary keys, among q elementary keys recorded in the secret memory zone of the medium, in which case the diversified secret datum is then made up of the combination of information contained at these p addresses.

Also as noted above, the object runs an algorithm Ao. Generally, this algorithm is embedded in a nonvolatile memory of the ROM or PROM type, and can differ from one type of object to another. For this reason, the identification data IO of the object can also be representative of the algorithm run by the object, or, in other words, may be representative of the type of object used.

In that case, when signatures are verified, as will be described in detail hereinafter, a specific control module is associated with a verification device. The structure of this module will be described in detail hereinafter, in conjunction with the description of the signature verification steps.

The development of the datum E at the moment of the signature can be done in various ways and depends on the algorithm Aa recorded in the processing circuits of the signature device.

In one embodiment, the external datum E is developed automatically by the processing circuits of the device 1. It may be a random datum, for instance. To that end, the device then includes a random number generator.

In such a case of automatic development, this external datum E is written among the complementary information IC of the secondary file FS, so that the verification device can retrieve the key K.

In another embodiment, the external datum E is a function of or is made up of the date and/or time of signature of the file. In that case, either the datum E itself or information enabling its recalculation at the moment of signature verification, or in other words information correlated with the date and/or time, is written among the complementary information IC of the secondary file FS.

In another embodiment, the external datum E is made up of information extracted from and/or relating to the primary file FP itself. The location and nature of this information may be known in advance, or it may be determined in random fashion, by the processing circuits of the device, at the very moment the signature is calculated.

Hence in another embodiment, the external datum E is constituted from a predetermined number n of 8-bit bytes selected from among the first 8-bit bytes of the file, or from among the first 8-bit bytes of the first portion of the file handled in the calculation of the signature.

This number A and the location of the 8-bit bytes to be used can be fixed once and for all. In that case, the datum E may not be included in the secondary file, since the determination of the algorithm Aa by the verification device enables it to determine how this datum E was developed.

In yet another embodiment, the external datum E is correlated with the name of the file and/or its header and/or size, and/or more generally with any information drawn from the file.

In another embodiment, the number n and/or location of the 8-bit bytes to be used is determined in random fashion by the device at the moment the external datum E is developed. In that case, either the datum E or the information enabling recalculation of this datum, for instance the number n and/or the location of the 8-bit bytes to be used, is written among the complementary information IC of the secondary file FS.

To summarize, when the external datum E has been developed, the key K is calculated in the portable medium of the signer, as a function of datum E and of the secret datum S or Sd that this medium includes;

as applicable, the datum E, or information enabling its retrieval by the verification device, is written into the secondary file FS;

if the secret datum of the medium is a diversified datum SD, then an identification datum or information IO, enabling its retrieval by the verification device, is transmitted from the medium to the signature device and then written by the latter into the secondary file FS;

the signature SG is calculated from the key K and from at least part of the file and then written into the secondary file;

information enabling a determination of which portion or portions of the file were used to calculate the signature is written into the secondary file.

It is understood that if more than one signer is involved, a secondary file or separate recordings are created for each one of them. As a result, a plurality of secondary files may be attached to the same primary file, or the secondary file may have as many recordings as there are signatures.

Verification of one or more signatures can be done by one and/or the other of the signers and/or by third parties, on the condition that they have at their disposal an apparatus arranged for that verification. In fact, this apparatus must be similar to that which was used to calculate each signature. It may even be the same one that was used for that calculation.

The verification operation comprises recalculating each signature, using the same parameters as those that were used to set up the signature, and comparing the recalculated signature with the corresponding signature written in the secondary file. To do so, the verification apparatus includes processing and comparison circuits.

Preferably, to prevent a person seeking to commit fraud, who observes the verification, from being be able to benefit from the results, the verification apparatus has processing and memory circuits arranged so that a recalculated signature is never divulged outside these circuits, and only the result of the comparison is indicated. The data necessary for the recalculation are then processed in a secret memory zone of the verification apparatus, and the recalculated signature is erased after the result of the comparison has been indicated.

To be able to recalculate the signature, as noted above, the verification apparatus must first be capable of recalculating the key K that was used to obtain the signature. It will be recalled that this key was calculated from a diversified secret datum Sd or a nondiversified secret datum S contained in a secret memory zone of a portable object belonging to the signer.

When the secret datum is diversified, by adaptation as described above of the method described in the aforementioned patents, the apparatus can include a device with a specific control module, which includes a secret memory zone and circuits for processing information contained in this zone, in order to prevent this information from leaving this module.

In one embodiment, this module is intended to reside within the device.

In a variant of this embodiment, the module is comprises a portable memory and microprocessor object 4 similar to that used by the signers.

In a preferred embodiment, some or each of the portable objects at the disposal of signers are usable as signature verification modules.

Hence an object makes it possible not only to sign but also to verify all the signatures calculated by cards of the same family, that is, for example, those having diversified secret data Sd that are developed from either the same secret basic datum or in the manner described in the aforementioned patents.

In this case, the diversified datum of any arbitrary object can be recalculated or reconstituted by some or each of the objects of the same family in order to verify the signatures. It is understood that an object used for verification never furnishes a recalculatable signature or the reconstituted diversified datum.

This allows anyone to sign and verify using the same object, but prevents one signer from reproducing the signature of another.

Thus by applying the teaching of the aforementioned patents, it suffices for the secret zone of the control module to include the possible q parameters, and reading the identification information IO associated with a signature SG in the secondary file enables the module, in its processing circuits, to reconstitute the secret datum Sd of the object that was used to calculate the signature, but without ever divulging this secret datum, by reading the contents of the addresses specified by the identification information.

If the datum is not diversified, it suffices for the device to be connected to a module having a secret memory zone in which the secret datum S is reproduced, and processing circuits arranged so that the data of this secret zone will be accessible only to these processing circuits. In one embodiment, such a module is intended to remain within the device, and the processing circuits may be those of the device; in another embodiment, the module is constituted on the basis of a portable object. In a preferred embodiment, each portable object at the disposal of a signer can be used as a verification module.

The verification device is arranged to retrieve the external datum E from the information that has been written for that purpose in the secondary file FS during the signature phase (the datum E itself, the date and/or time, etc.).

Next, the key K is recalculated from the external datum E and from the diversified or nondiversified secret datum, retrieved by the module and accordingly corresponding to the one that was used in the calculation of the signature. Recalculation of this key K requires that the secret datum not be divulged, and is therefore done by the circuits associated with this secret zone, or in other words, depending on the embodiment, the circuits of the device or the circuits of a portable object.

The processing circuits of the device then determine, from the secondary file FS, which portion or portions of the primary file were used to calculate the original signature, and in a secret fashion they recalculate a signature SG' by handling the recalculated key K and the aforementioned portion or portions of the primary file.

Finally, the comparison circuits compare the recalculated signature SG' to the signature SG read in the secondary file, and then the device indicates to the person performing the verification only the result of the comparison (i.e. positive or negative), using the display means with which it is provided.

The preferred embodiment, described above, accordingly comprises causing a key K to be calculated in the object, and then causing the signature to be calculated by the processing circuits of the device, as a function of this key K and at least one portion of the primary file FP.

In another embodiment, the signature is calculated in the object, which makes it unnecessary to generate the external datum E. In that case, the algorithm Aa recorded in the device is such that its processing circuits manage and send to the object each portion selected from the file and optionally one or more other parameters that it is appropriate to use, such as the date and/or time and/or the name and size, etc. The circuits of the object, in the final analysis, restore the signature SG, which is a function of the portions of the file and other parameters that the circuits have received from the device, and then they transmit this signature to the device so that it will be written in the secondary file FS. Therefore, one arrives at a comparable result, but no transfer whatever of keys to the device is required. Moreover, if one or more other parameters are used, information enabling their retrieval must be written in the secondary file.

In the case of calculation of the signature by the object, the circuits of the device have elementary functions. The algorithm Aa memorized in the device is reduced to a minimum, enabling exchanges with the object and with the files contained in its mass memories.

However, this embodiment requires the use of portable objects with more powerful calculation capacity and more powerful algorithms than the preferred mode. The preferred mode described above in fact simply requires that the processing circuits of the object be capable, in response to an incoming order, of furnishing a result that is a function of the secret datum S or Sd that they contain and an external datum E.

The hardware and software realization of the invention is within the competence of one skilled in the art and need not be described in further detail.

The signature or signatures of a primary file FP can be verified while the primary file and its secondary file or files FS are in the same device as that used for the calculation, or after the primary file and its secondary file or files FS have been transferred to a different device.

The transfer is not the subject of the present invention. It can be done by any known means or method. It may, for example, involve an electronic transfer over a data line, a transfer with the aid of a hardware medium such as a diskette, or any other type of data transfer. Quite clearly it is appropriate for the primary file and the secondary file or files associated with it to be transferred to a device that is capable of performing the signature verifications, i.e., a device that has a suitable software structure.

If the invention is to be implemented easily, it is preferable to provide a system that enables easy dialog with the user of the system, whether he is the signer or the person verifying the signature, i.e. a system that is ergonomic and user-friendly in particular.

This is why the invention is preferably implemented using file processing hardware enabling the use of dialog windows, such as those operating in the Microsoft Windows (Windows is a registered trademark of Microsoft Corp.) environment.

Figure 2:
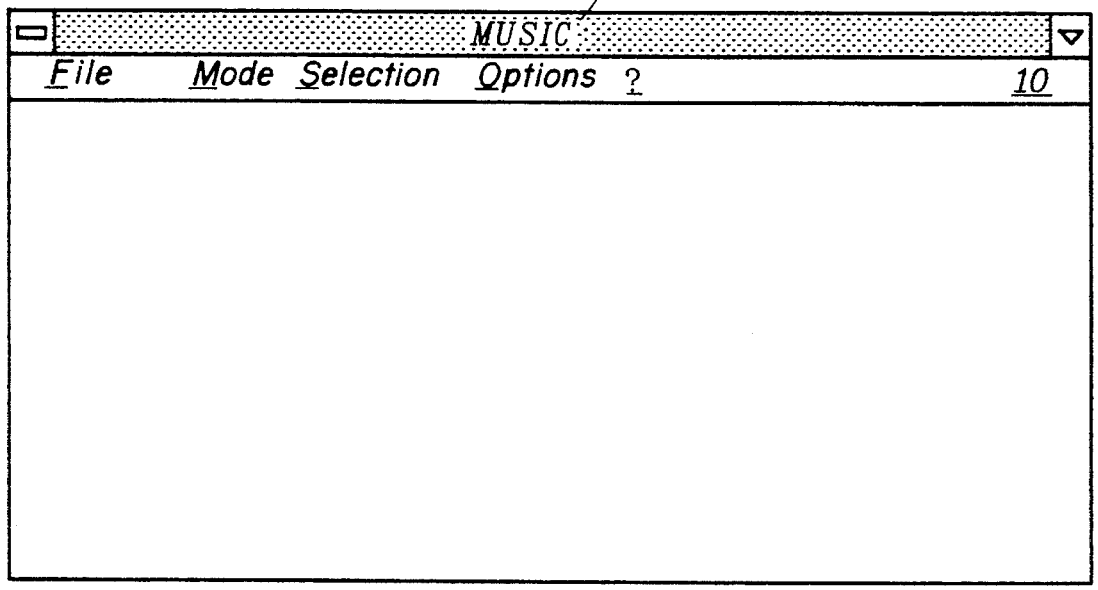

FIG. 2 shows an elementary dialog window that can be opened in order to start either the calculation or the verification of a signature or signatures attached to a file.

The title 8 of the application appears in a title bar 9 at the top of the window, and the menus available appear in a menu bar 10.

A first menu, "MODE", makes it possible to choose either the "signature" mode or the "signature verification" mode.

A second menu, "FILE", makes it possible to select any type of file contained in a memory of the device and that the user wishes to sign or of which he wishes to verify the signature or signatures. This may accordingly involve text files, data files, drawings, etc.

A third menu, "SELECTION", is accessible at least when the "signature" mode is active. It enables access either to a "manual selection" mode or to an "automatic selection" function, both of which will be described in detail hereinafter.

A fourth menu, "OPTIONS", makes it possible, for example, to choose a medium that has already been used for a signature or to assign the characteristics of a new medium. These concepts will be described in detail hereinafter.

Finally, a help menu, "?", may also be present.

Figure 3:
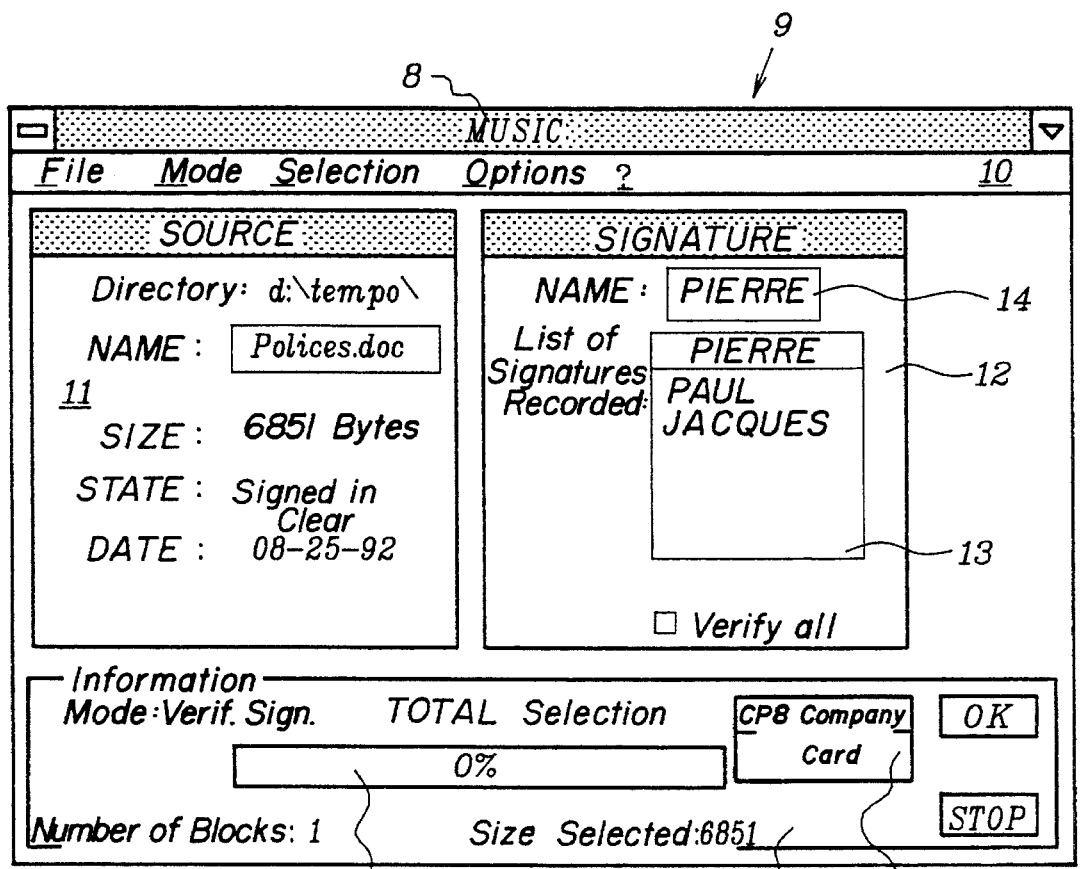
Figure 4:
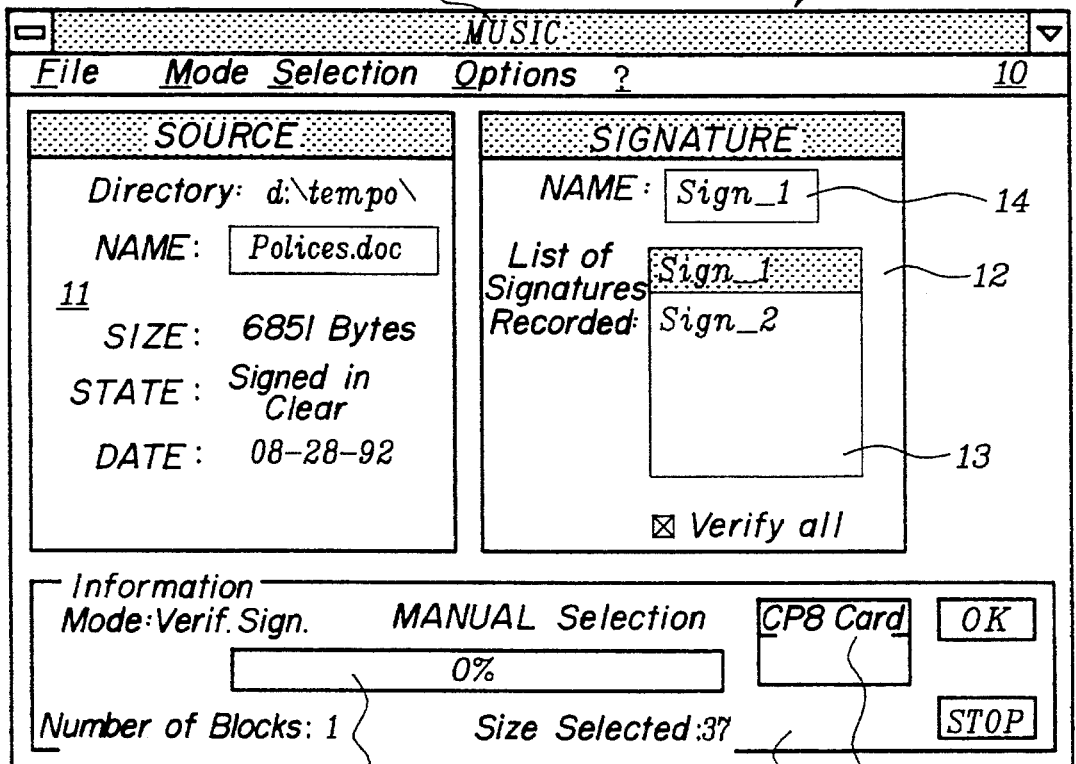

FIGS. 3 and 4 show two embodiments of windows which can be opened when a file has been activated by the "FILE" menu and when the signature verification mode has been activated by the "MODE" menu. These variants include only minimal differences, which will be highlighted when necessary.

Preferably, when the verification mode has been activated, there is no need for the "SELECTION" menu to be accessible. Conversely, the "FILE" and "MODE" menus must be accessible.

A first frame, "SOURCE" 11, appears when selected and contains information about the status of the validated file and indicates its name, whether it is signed or not, its size, the date of the file, and the directory in which it is located.

Moreover, a second frame, "SIGNATURE" 12, indicates the number and/or name of the signatures that may possibly associated with that file.

In the embodiment of FIG. 3, each of the signatures of this second frame 12 is marked with a name indicated in a first zone 13, in this case "Pierre", "Paul", etc., while in the embodiment of FIG. 4, each of the signatures of this second frame 12 is marked by an ordinal number, "sign 1", "sign 2", given by default by the device and indicated in the first zone 13.

A second zone 14 indicates the active signature, by its name (FIG. 3) or its number (FIG. 4).

In a third frame, "INFORMATION" 15, in FIG. 3, the words "total selection" appear, indicating that the signature "Pierre", which is now being verified, was calculated on the basis of the entire file. In the corresponding frame of FIG. 4, the words "manual selection" appear, indicating that the signature "sign one" now being verified was calculated on the basis of a portion of the file.

In addition, a zone 15 of this third frame 16 indicates the name of the medium that was used for calculating the signature that is now being verified.

"OK" or "STOP" buttons, which are accessible for instance by means of a pointer moved around using a mouse or the keyboard 6a, are placed in this frame 15. They make it possible to start or stop the verification.

In another zone 17 of this frame 15, the percentage of progress in the verification calculation appears after the start of verification has been validated with the "OK" button. Furthermore, the zone 17 makes it possible to display a bar whose length indicates the relative progress of the validation.

Figure 5:
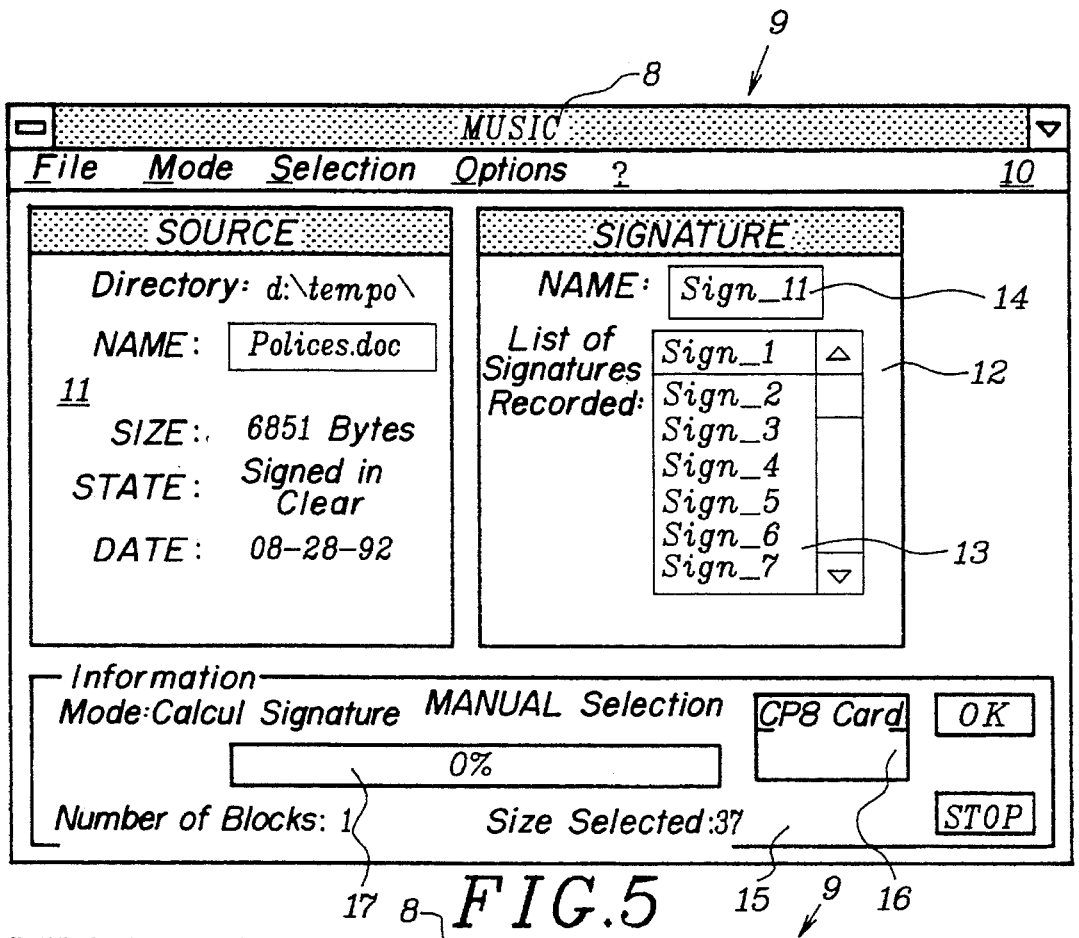
Figure 6:
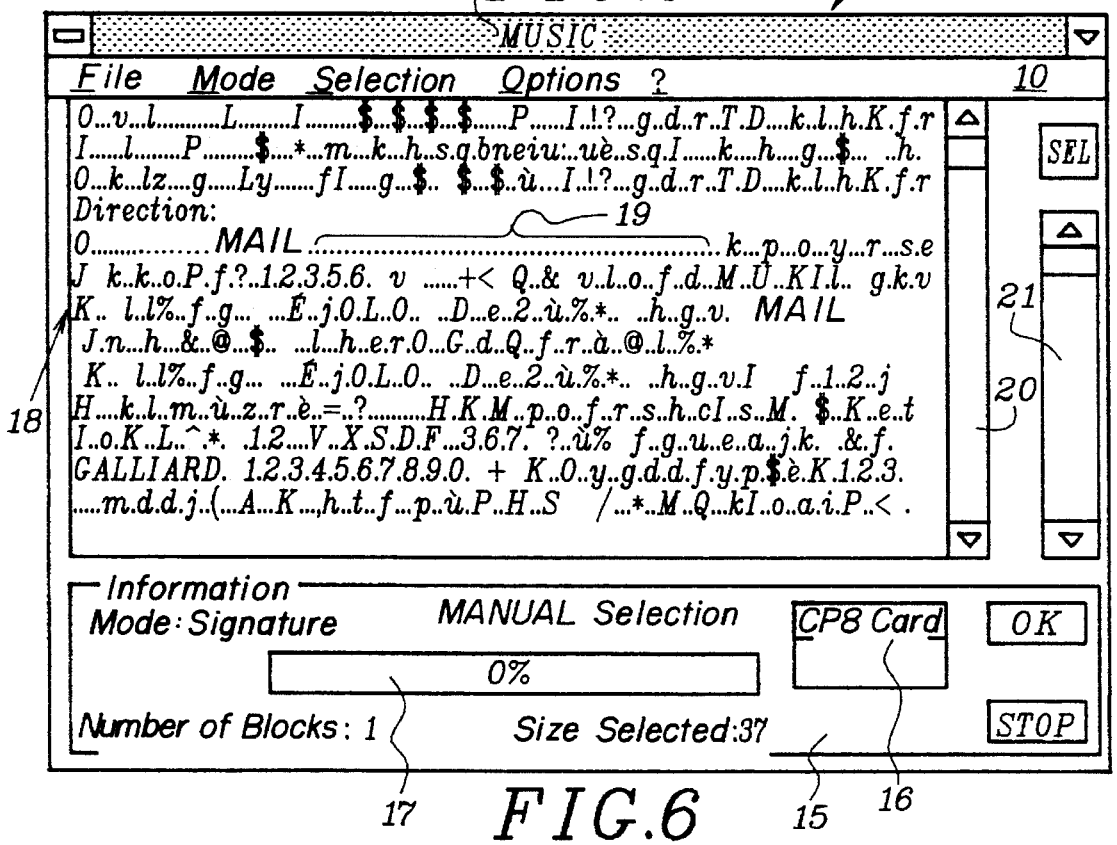

Windows that can be opened during the creation or addition of a signature are shown in FIGS. 5 and 6. The choice of the "signature" is done from the "MODE" menu, which is accessible at the start of the application or from the "verification" mode, or naturally when the "signature" mode itself has been validated.

Preferably, when the "signature" mode is activated, the total selection of the file is done by default; that is, the signature will be calculated on the basis of the entire file. However, manual selection of one or more portions of the file can be done as will be explained later.

Activating the "signature" mode makes the entire set of menus accessible.

FIG. 5 shows a window that opens when the "signature" mode and the manual selection have been activated.

The open window is similar to that of FIGS. 3 or 4, except that in the information frame 15, it is indicated that the active mode is the mode of signature calculation, and the words "manual selection" appear in the clear.

It should be noted that if the selection is done by default, a window, not shown in the drawings, opens and has only one single difference in appearance from that of FIG. 5: in the information frame 15, the words "total selection" appear instead of "manual selection".

Moreover, the name and information relating to the file now being signed appear in the first frame, "source", and the name or number of the signature now being made appear in the second zone 14 of the second frame 12.

Finally, in the specific zone 16 of the third frame 15, the name of the medium that is used to calculate the signature now being made is written.

In a preferred embodiment, action upon the "OK" button of the information frame 15, when total selection has been chosen either voluntarily or by default, causes the start of signature calculation.

Conversely, in this preferred embodiment, manual selection causes the opening of the window shown in FIG. 6, which enables displaying the contents of the file and selecting certain zones in it using a cursor, such as, for example, a cursor that is moved about by a mouse or by keys of the keyboard 6a of the processing device.

The "SOURCE" and "SIGNATURE" frames that appear in the preceding windows are replaced by a single frame 18, in which the contents of the file are displayed, while the frame 15, "INFORMATION", remains present.

The selection of one or more portions of the file can be performed manually using a cursor shifted by a mouse or by keys of the keyboard. The example of FIG. 6 shows the selection of a single portion 19, also called a block, of a text file made up of 37 8-bit bytes. The information frame indicates the number of blocks and the total number of 8-bit bytes selected.

This window may include one or more linear selectors 20, 21, known in the art, for scrolling the file on the screen in order to provide the possibility of searching for distinct portions of the file. A first selector 20, for example, enables scrolling within the current page, and a second selector 21 enables scrolling page by page.

Action on the "OK" button validates the selection and starts the signature calculation.

The "OPTIONS" menu makes it possible to specify the characteristics of a new medium to the system, for example at the time of a signature, or to search for the characteristics of a medium that has already been specified at the time of a verification.

Therefore it must be validated by a new signer who wishes to specify to the system, what type of card he is using for the signature.

If a new signer uses a medium such as a card whose characteristics have already been input via a different card, it is this menu that he uses to specify this.

Figure 7:
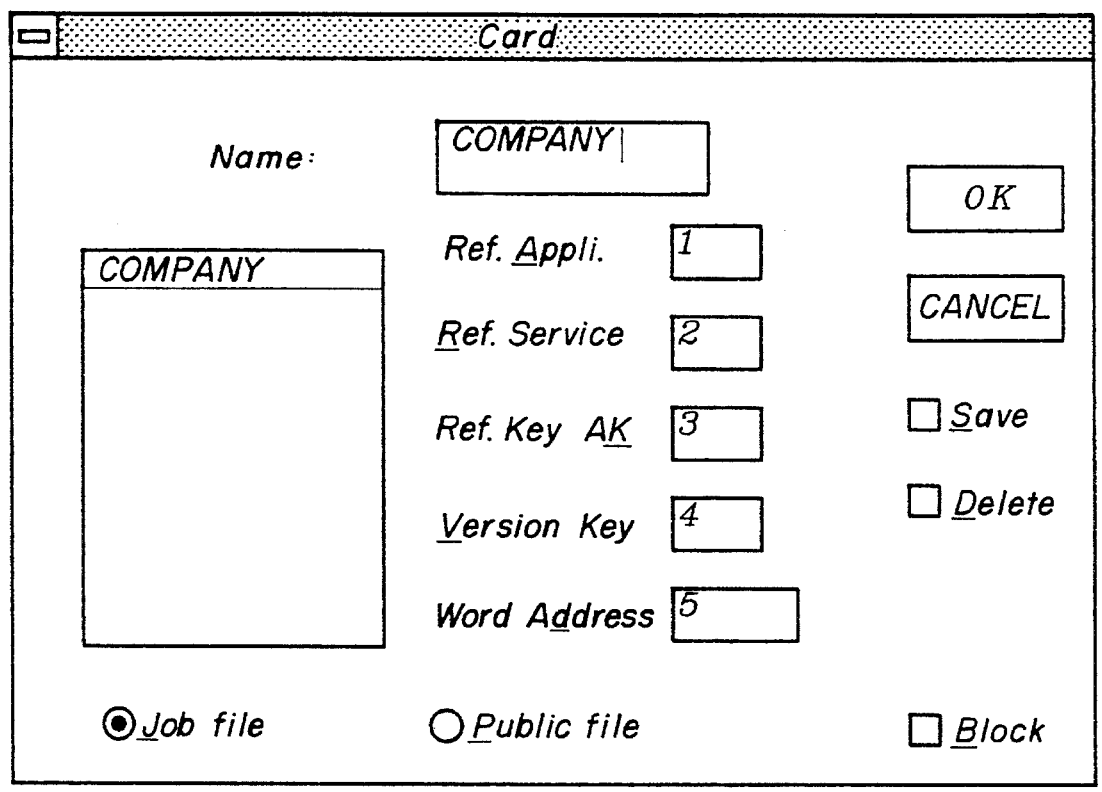

His validation causes the opening of a "CARD" window like that shown in FIG. 7. It contains boxes making it possible to enter various parameters defining a new medium used for calculating a new signature. It is with this menu that the media containing different algorithms and/or differently diversified keys can be identified at the time of calculation, and that a later verification can take place.

Hence among other things, this menu can be used to indicate the applications "Ref Appli" (text processing, tabulator, etc.) to which the medium can have access. Additionally, one can precisely identify the type of medium involved and the key versions ("Ref key", "key version") that it contains, so that the system can function properly. More generally, this menu makes it possible to specify to the system all the necessary parameters that relate to a medium, to have it available for calculation and verification.

I claim:

1. A method for signing a primary information file, comprising the steps of:

defining a secret datum which is specific to an identity of at least one signer, and a portable object having memory and processing circuits, said portable object being dedicated to and at the disposal of said at least of signer wherein said memory has a secret zone used for storing said secret datum;

selecting, in said primary information file, an arbitrary file portion on which the at least one signer intends to calculate a signature;

calculating the signature by using an information processing device incorporating a signature algorithm and carrying out a calculation with said algorithm based on said secret datum from said portable object and said arbitrary file portion, wherein a result of said calculation defines said signature;

using a secondary file for storing file identification information adapted for identifying, in said primary information file, said arbitrary file portion used to calculate said signature; and linking said primary information file, said signature and said secondary file.

2. The method of claim 1, comprising:

defining said secret datum by combining a reference secret datum with signer identity information; and storing in the secondary file said signer identity information.

3. The method of claim 1, comprising storing, in said secondary file, algorithm information defining a type of signature algorithm used for calculating said signature.

4. The method of claim 1, comprising storing, in said secondary file, portable object information defining a type of portable object used for calculating said signature.

5. The method of claim 1, further including signing said primary information file by a plurality of signers having different secret data, respectively, in different portable objects, respectively, by:

selecting, in said primary information file, as many arbitrary file portions as signers on which the respective signers intend to calculate their signature;

calculating each signature by using an information processing device incorporating a signature algorithm and carrying out a calculation with said algorithm based on said secret datum of said signers, respectively, taken from the corresponding portable object and on the corresponding arbitrary file portion, a result of said calculation defining each signature;

using a secondary file for storing file identification information adapted for identifying, in said primary information file, all said arbitrary file portions which were used to calculate said signature; and linking said primary information file, said signatures and said secondary file.

6. The method of claim 5, comprising:

defining said different secret data by calculating said different secret datum from a common secret datum, respectively, combined with different signer identity information of said plurality of signers; and storing, in the secondary file, said different signer identity information of said plurality of signers; and storing, in the secondary file, said different signer identity information.

7. The method of claim 1, wherein calculating the signature comprises:

running a first signature algorithm on the information processing device;

running a second key algorithm on the portable object;

developing and transmitting an external datum from circuits of the processing device to the circuits of the object;

calculating a key on the circuits of the object by running said second algorithm on the circuits of the object and using the external datum and the secret datum;

transmitting said key from the circuits of the object to the circuits of the processing device;

calculating the signature by running the first signature algorithm on the circuits of the processing device using the key and said arbitrary file portion; and storing said external datum in said secondary file.

8. The method of claim 1, wherein calculating the signature comprises:

running said signature algorithm on the portable object;

transmitting said arbitrary file portion from the circuits of the processing device to the circuits of the object; and calculating the signature using said arbitrary file portion and said secret datum by running said signature algorithm on the circuits of the object.

9. The method of claim 1, further comprising verifying said signature linked with said primary information file, the step of verifying said signature comprising:

identifying said arbitrary file portion in said primary information file by using said file identification information in said secondary file;

providing an information processing device incorporating said signature algorithm and, in a secret memory zone, said secret datum;

recalculating the signature in the device by carrying out a calculation with said algorithm based on said secret datum from said secret memory zone and said arbitrary file portion identified and taking into account any other information previously stored in the secondary file when calculating the signature, the result of which being the recalculated signature;

comparing the recalculated signature with the signature linked with said primary information file; and indicating a result of the comparison without disclosing the recalculated signature.

10. The method of claim 9, wherein said primary information file was signed by a plurality of signers having different secret data, respectively, the step of verifying the different signatures comprises:

identifying, in said primary information file, all the arbitrary file portions which the respective signers have signed by using said file identification information in said secondary file;

recalculating each signature in the device by carrying out a calculation with said algorithm based on the secret datum of the signer concerned, taken from said secret memory zone and the corresponding arbitrary file portion identified and taking into account any other information previously stored in the secondary file when calculating that signature, the result of which being the recalculated signature for that signer;

comparing each recalculated signature with the signature linked with said primary information file; and indicating a result of each comparison without disclosing the recalculated signatures.

11. The method claim 10, wherein each secret datum was obtained by calculating said secret datum from a common secret datum combined with different signer identity information, the information processing device being used to verify the signatures having, in said secret memory zone, said common secret datum, the step of recalculating the signatures comprising:

recalculating, for each signer, a corresponding secret datum by combining the common secret datum taken from the secret memory zone with the signer identity information of that signer, taken from the secondary file; and recalculating each signature based on the secret datum of the signer concerned.

12. An apparatus for signing a primary information file, including:

a portable object having a memory and processing circuits, said portable object being dedicated to and at the disposal of a signer and a secret zone of said memory memorizing a secret datum which is specific to an identity of at least one signer;

information processing means;

means for displaying the content of the primary information file;

means for enabling the signer to select in primary information file, an arbitrary file portion for use calculating signature;

means for calculating the signature by using a signature algorithm and carrying out a calculation with said algorithm based on said secret datum from said portable object and said arbitrary file portion, a result of said calculation being said signature;

means for using a secondary file for storing file identification information adapted for identifying in said primary information file, said arbitrary file portion used to calculate said signature; and means for linking said primary information file, said signature and said secondary file.

13. The apparatus of claim 12, further comprising:

means for displaying a name or a rank of each signature already linked with a file;

means for selecting at least one signature to be verified; and means for displaying the rank or the name of a signature whose calculation or verification is in progress.

14. The apparatus of claim 12, further comprising:

means for specifying characteristics of the portable object being used for a signature whose calculation is in progress, or having been used for a signature whose verification is in progress, to the processing device.

15. The apparatus of claim 12, further comprising:

a verification device associated with a verification module adapted for at least one of retrieval and recalculation of parameters used to calculate the signature, said parameters being different than said portions of the primary information file used to calculate the signature, without disclosing said parameters.

16. The apparatus of claim 15, wherein the module is a portable electronic object having a memory and processing circuits, said portable object being capable of connection to the verification device.

17. The apparatus of claim 16, wherein the portable electronic objects at the disposal of the signers are adapted to include said verification module, wherein the objects serve both to sign the files and to verify signatures calculated using nondiversified datum or diversified datum.

* * * * *